Jan. 19, 1954    D. A. SKINNER    2,666,687
PROCESS FOR THE MANUFACTURE OF CRYSTALLINE
AMMONIUM SULFITE MONOHYDRATE
Filed Nov. 1, 1948
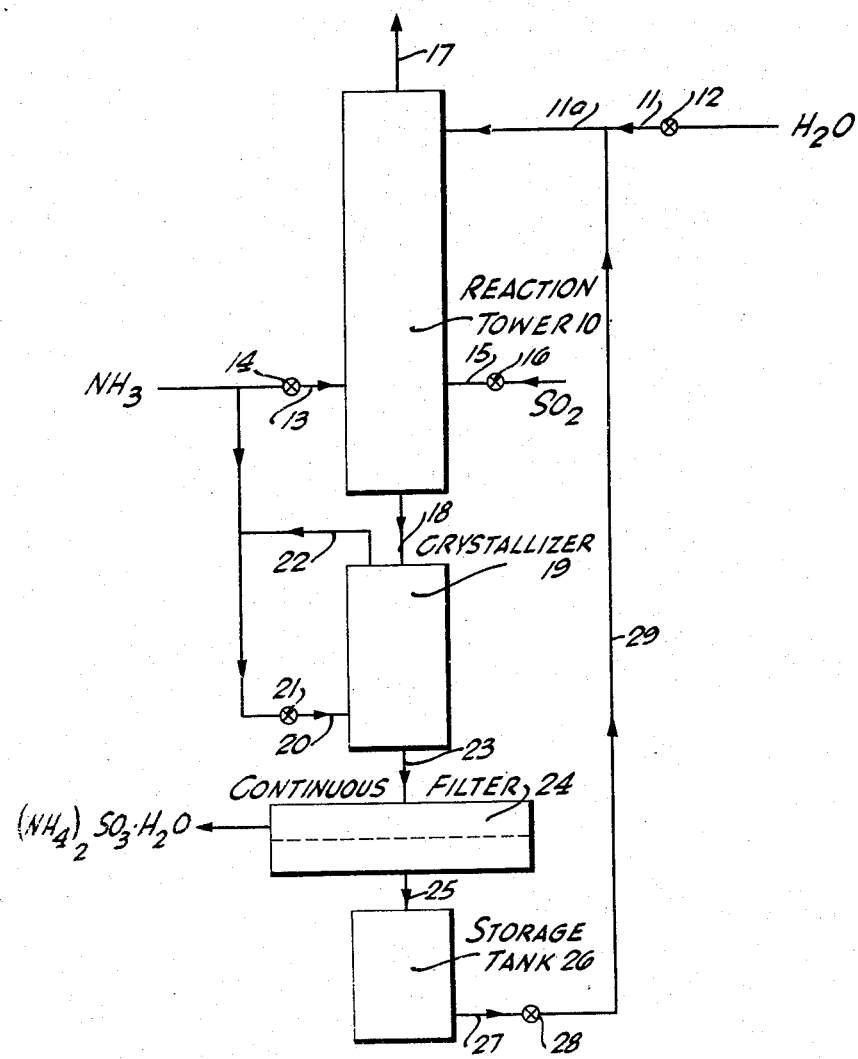
INVENTOR.
DAVIS A. SKINNER,
By Richard C. Van
ATTORNEY.

UNITED STATES PATENT OFFICE 2,666,687

PROCESS FOR THE MANUFACTURE OF CRYSTALLINE AMMONIUM SULFITE MONOHYDRATE

Davis A. Skinner, Compton, Calif., assignor to Union Oil Company of California, Los Angeles, Calif., a corporation of California Application November 1, 1948, Serial No. 57,801

4 Claims. (Cl. 23—129)

This invention relates to the manufacture of ammonium sulfite, and in particular concerns an improved process for preparing pure crystalline ammonium sulfite from sulfur dioxide and ammonia.

Ammonium sulfite is readily formed by reaction between sulfur dioxide and ammonia in the presence of water, the reaction being effected simply by passing sulfur dioxide gas into aqueous ammonia, whereby the ammonium sulfite is obtained in the form of an aqueous solution. By adding methanol or other water-miscible organic solvent to such solution, the ammonium sulfite may be caused to crystallize out of solution in the form of its monohydrate, $(NH_4)_2SO_3 \cdot H_2O$. However, the use of organic solvents in this manner to precipitate the ammonium sulfite is not commercially feasible because of the expense involved in dehydrating the mother liquor to recover the organic solvent for re-use in the process. Similarly, recovery of the ammonium sulfite from the aqueous solution by evaporating off the water is not satisfactory since a considerable portion of the ammonium sulfite becomes decomposed during the evaporation operation. Moreover, evaporation processes in general are disadvantageous in that they require the expenditure of large amounts of heat, and are not particularly adapted to continuous operation.

It is accordingly an object of the present invention to provide an improved process for the manufacture of crystalline ammonium sulfite.

Another object is to provide an ammonium sulfite process which does not require the use of evaporators or organic solvents for recovering the ammonium sulfite product in crystalline form.

A further object is to provide an ammonium sulfite process which is adapted for continuous operation.

Other and related objects will be apparent from the following detailed description of the invention, and various advantages not specifically referred to herein will occur to those skilled in the art upon employing the invention in practice.

I have now found that the above objects and attendant advantages may be realized in a process whereby ammonia and sulfur dioxide are caused to react in the presence of water to form an aqueous solution of ammonium sulfite in the usual manner, and such solution is thereafter treated alternately with ammonia and sulfur dioxide to effect respectively crystallization of ammonium sulfite monohydrate and formation of further amounts of ammonium sulfite in dissolved form. During the alternate treatments with ammonia and sulfur dioxide, water is added to the system to replace that used in the formation of the ammonium sulfite as well as that associated with the crystalline salt as water of crystallization. More particularly, the process of the invention comprises the following steps:

1. Formation of an aqueous solution of ammonium sulfite by reaction between ammonia, sulfur dioxide and water according to the equation

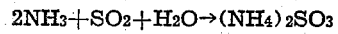

$$2NH_3 + SO_2 + H_2O \rightarrow (NH_4)_2SO_3$$

2. Treatment of such solution with ammonia whereby the ammonium sulfite is precipitated out of solution in the form of its crystalline monohydrate.

3. Separation of the crystallized ammonium sulfite monohydrate from the mother liquor by filtering, centrifuging or other suitable operation.

4. Dilution of the mother liquor with sufficient water to replace that used in the formation of the ammonium sulfite monohydrate.

5. Treatment of the diluted mother liquor, which contains dissolved ammonia as a result of step 2, with sulfur dioxide whereby further quantities of ammonium sulfite are formed as in step 1.

It will be readily perceived that this sequence of operations returns the system to the condition prevailing at the end of step 1, and that by repeating steps 2 to 5 in sequence the process may be carried out for as long as may be desired. If continuously operating means are employed for separating the crystallized ammonium sulfite monohydrate from the mother liquor in step 3, i. e., a rotary-type filter, the process may be operated continuously since the other steps merely involve the addition of liquids or gases.

The invention may be more readily understood by reference to the accompanying drawing, the single figure of which represents a schematic flow sheet of a preferred mode of practicing the invention whereby the above sequence of operations is effected in a continuous manner.

Referring now to the drawing, the initial step of the process, i. e., the formation of ammonium sulfite in aqueous solution, is conveniently carried out in a reaction tower 10 which may be filled with materials to promote good gas-liquid contact, e. g., bubble-cap plates, Raschig rings, porous tiles, etc. Water is introduced into the top of the reaction tower through lines 11 and 11a at a rate controlled by valve 12. Within the tower the stream of water may be broken up into fine streams or drops by a sprinkler-head or sparger. Ammonia or an ammonia-containing gas, such as coke-oven gas, is introduced near the bottom of the tower through line 13 at a rate controlled by valve 14. Sulfur dioxide or a gas containing sulfur dioxide is simultaneously introduced into the tower through line 15 at a rate controlled by valve 16. Within the reaction tower 10, the ammonia and sulfur dioxide gases rise counter-current to the descending shower of water, and react therewith to form an aqueous solution of ammonium sulfite in accordance with the reaction equation previously given. Preferably the reactants are so proportioned that the aqueous ammonium sulfite is of relatively high concentration, e. g., 20–30 per cent by weight, or even saturated. Any unreacted ammonia or sulfur dioxide, or any inert gases which may be present, are discharged from the top of the tower through line 17 to waste or to suitable facilities for recovering useful components. The aqueous ammonium sulfite is withdrawn from the bottom of the tower through line 18 and passed to crystallizer 19 which may take the form of a simple closed vessel or tank. Ammonia or an ammonia-containing gas is introduced into the crystallizer through line 20 at a rate controlled by valve 21 in such manner that it is intimately contacted with the aqueous ammonium sulfite solution. As the liquor within the crystallizer becomes more and more saturated with ammonia, the ammonium sulfite precipitates out of solution as crystalline ammonium sulfite monohydrate. In order to promote good absorption of the ammonia in the ammonium sulfite liquor, the crystallizer may advantageously be equipped with a stirrer or other agitating means. Any ammonia not absorbed within the crystallizer is led off through line 22 and recirculated. The ammonium sulfite monohydrate crystals in the form of a slurry in concentrated aqueous ammonia are withdrawn from the crystallizer through line 23 and are passed to a continuous filter 24 where they are separated from the mother liquor and passed to suitable drying and storage facilities, not shown. The mother liquor leaving the filter through line 25, and comprising a concentrated aqueous solution of ammonia saturated with ammonium sulfite, is passed to a storage tank from which it is withdrawn through line 27 at a rate controlled by valve 28 to be recycled back to the top of reaction tower 10 through lines 29 and 11a. Dilution of the ammoniacal recycle liquor occurs in line 11a where it is mixed with the water entering the system through line 11.

When the above-described process is initiated, all of the ammonia used in forming the ammonium sulfite enters the system near the bottom of the reaction tower through line 13 and valve 14. Similarly, the amount of water introduced into the top of the tower via line 11 and valve 12 is in excess of that required for the formation of the ammonium sulfite. As the process continues, however, ammonia becomes supplied to the tower in the form of the aqueous ammoniacal recycle liquor, so that eventually the quantity of ammonia supplied directly to the tower may very drastically be reduced or even entirely cut off, substantially all of the ammonia entering into the reaction being introduced into the system at the crystallizer where it is initially employed to precipitate the ammonium sulfite monohydrate. Similarly, once a steady cycle has been established, the amount of water supplied to the system may be reduced to the quantity actually used up in the reaction plus a small additional quantity to make up for handling losses.

It will be apparent from the above that the process of the invention is highly efficient in that the only materials supplied to the process are those which actually enter the reaction by which the desired product is formed. The entire process may be carried out at room temperature without the expenditure of heat. Recovery of the ammonium sulfite product from the aqueous solution in which it is initially obtained is accomplished without the use of extraneous precipitating agents or evaporation operations. The ammonia which is employed for precipitating the crystalline product is recovered as a matter of course and is employed in the formation of more product. Similarly, the ammonium sulfite which saturates the mother liquor leaving the filter is entirely recovered since all of such liquor is recycled back to the reaction zone. Even the water is employed only in the amount required by the reaction.

Inasmuch as the present process involves the absorption of gases in liquids, it is desirable that it be carried out at as low a temperature as may be convenient. The reaction between ammonia, sulfur dioxide and water in the reaction tower is exothermic in nature, as is the absorption of ammonia in water which occurs in the crystallizer. Accordingly, it is usually desirable that means be provided for withdrawing heat from the system at either or both of these points. Such means may comprise internally or externally disposed coils through which water is circulated. Alternatively, the gases introduced into the reaction tower and the crystallizer may be led in at a plurality of points in order to secure a more even dissipation of the heat.

The rates at which the reactants are introduced into the system may be varied between wide limits. However, since it is desirable to suppress the formation of ammonium acid sulfite, $(NH_4)HSO_3$, and ammonium polysulfite, $(NH_4)_2S_2O_5$, an excess of ammonia is maintained in the system. Since all of the ammonia is recycled within the system, no loss occurs through the use of such excess. The presence of excess ammonia is further advantageous in that it suppresses corrosion of the equipment by the acidic sulfur dioxide. As previously stated, water is employed in an amount sufficient to replace that used up in the formation of the ammonium sulfite monohydrate plus enough to make up for losses, e. g., the water lost by adherence to the crystalline product taken from the filter.

While the process has herein been described as being carried out in a continuous manner, it will be understood that it is equally well adapted to semi-continuous or batch-wise operation. Thus, for example, sulfur dioxide may be absorbed in ordinary commercial aqueous ammonia to form an aqueous solution of ammonium sulfite which preferably contains from about 20 to about 30 per cent by weight of the ammonium sulfite. Such solution may then be saturated with ammonia and filtered to separate the ammonium sulfite monohydrate crystals which are thereby precipitated, and the mother liquor, which consists of concentrated aqueous ammonia saturated with ammonium sulfite, may be passed to storage. When it is desired to prepare a further quantity of ammonium sulfite, the mother liquor is withdrawn from storage, diluted with water, and treated with sulfur dioxide as herein explained. In this way the mother liquor from each preparation is employed as a starting material for the next succeeding batch.

The following example is illustrative of the practice of the invention, but is not to be construed as limiting the same. All proportions are in parts by weight.

*Example*

Sulfur dioxide is absorbed in commercial aqueous ammonia to obtain aqueous ammonium sulfite analyzing 37.4 per cent by weight of ammonium sulfite monohydrate. Approximately 1194 parts of this solution is then treated with gaseous ammonia. During the addition of the ammonia, the temperature increases somewhat but upon cooling crystalline ammonium sulfite monohydrate precipitates from solution. The solution is then filtered whereby there is obtained 377 parts of dry crystalline ammonium sulfite monohydrate, representing a recovery of about 84.3 per cent, and 1101 parts of mother liquor consisting of concentrated aqueous ammonia saturated with ammonium sulfite. The mother liquor is then diluted with about 100 parts of water, and is treated with about 360 parts of sulfur dioxide to form additional ammonium sulfite. By treating the resulting liquor with 210 parts of ammonia, ammonium sulfite monohydrate is precipitated as before and is recovered in the amount of 712 parts by weight. The mother liquor amounts to about 1058 parts by weight and contains about 32 per cent by weight of dissolved ammonia. It may again be diluted and treated with sulfur dioxide as before to form more ammonium sulfite, and the process continued indefinitely.

While the advantages of the process of the invention are fully realized in a semi-continuous or batch-wise type of operation, it is preferred to carry out large-scale operations in a continuous manner as previously described with reference to the drawing. Many variations within the scope of the invention will be apparent to those skilled in the art. Thus, for example, the reaction vessel is not limited to the packed tower type herein described, but may take a variety of other forms. Similarly, the crystallizer which has been described as a simple tank, may be provided, for example, with a conical bottom in which the precipitated ammonium sulfite monohydrate crystals are allowed to settle before being passed to the filter. A large proportion of the mother liquor may thus be separated from the crystals by simple decantation and passed to the storage tank without passing through the filter.

Other modes of applying the principle of my invention may be employed instead of those explained, change being made as regards the methods herein disclosed provided the step or steps stated by any of the following claims, or the equivalent of such stated step or steps, be employed.

I, therefore, particularly point out and distinctly claim as my invention:

1. In a process for the manufacture of crystalline ammonium sulfite monohydrate, the steps which comprise (1) passing sulfur dioxide into an aqueous alkaline solution containing dissolved ammonium sulfite and ammonia in the substantial absence of gaseous ammonia and in an amount less than that required to react with all of said dissolved ammonia to form ammonium sulfite; (2) subsequently passing ammonia into the resulting solution in the substantial absence of gaseous sulfur dioxide and in an amount in excess of that required to precipitate ammonium sulfite monohydrate, whereby there is obtained precipitated crystalline ammonium sulfite monohydrate and an alkaline mother liquor containing dissolved ammonium sulfite and ammonia; (3) separating said crystalline ammonium sulfite monohydrate from said alkaline mother liquor; (4) diluting said alkaline mother liquor with water; and (5) returning the diluted alkaline mother liquor to step (1).

2. In a process for the manufacture of crystalline ammonium sulfite monohydrate, the steps which comprise (1) passing sulfur dioxide into an aqueous alkaline recycle liquor containing dissolved ammonium sulfite and ammonia in the substantial absence of gaseous ammonia and in an amount less than that required to react with all of said dissolved ammonia to form ammonium sulfite; (2) flowing the liquor so obtained to a precipitation zone wherein gaseous ammonia is passed into said liquor in the substantial absence of gaseous sulfur dioxide and in an amount in excess of that required to precipitate crystalline ammonium sulfite monohydrate, whereby there is obtained precipitated crystalline ammonium sulfite monohydrate and an alkaline mother liquor containing dissolved ammonium sulfite and ammonia; (3) separating said crystalline ammonium sulfite monohydrate from said alkaline mother liquor; (4) diluting said alkaline mother liquor with water; and (5) returning the diluted alkaline mother liquor to step (1) as said aqueous alkaline recycle liquor.

3. In a process for the manufacture of crystalline ammonium sulfite monohydrate, the steps which comprise (1) continuously passing sulfur dioxide into an aqueous alkaline recycle liquor containing dissolved ammonium sulfite and ammonia in the substantial absence of gaseous ammonia and in an amount less than that required to neutralize said aqueous alkaline recycle liquor; (2) continuously flowing the liquid so obtained into a precipitation zone wherein gaseous ammonia is continuously passed into said liquor in the substantial absence of gaseous sulfur dioxide and in an amount sufficient to precipitate crystalline ammonium sulfite monohydrate, whereby there is obtained precipitated crystalline ammonium sulfite monohydrate and an alkaline mother liquor containing dissolved ammonium sulfite and ammonia; (3) continuously separating said crystalline ammonium sulfite monohydrate from said alkaline mother liquor; (4) continuously diluting said alkaline mother liquor with an amount of water at least equivalent to that consumed in the formation of the separated crystalline ammonium sulfite monohydrate; and (5) continuously returning the diluted alkaline mother liquor to step (1) as said aqueous alkaline recycle liquor.

4. In a process for the manufacture of crystalline ammonium sulfite monohydrate, the steps which comprise (1) passing gaseous ammonia into a concentrated aqueous alkaline solution of ammonium sulfite in the substantial absence of gaseous sulfur dioxide and in an amount in excess of that required to precipitate crystalline ammonium sulfite monohydrate from said solution, whereby there is obtained precipitated crystalline ammonium sulfite monohydrate and an alkaline mother liquor containing dissolved ammonium sulfite and ammonia; (2) separating said crystalline ammonium sulfite monohydrate from said alkaline mother liquor; (3) diluting said alkaline mother liquor with water in an amount at least equal to that consumed in the formation of the separated crystalline ammonium sulfite monohydrate; and (4) treating the diluted alkaline mother liquor with sulfur dioxide in the substantial absence of gaseous ammonia and in an amount less than that required to react with the ammonia which is contained in said diluted alkaline mother liquor, whereby there is formed a further quantity of the concentrated aqueous alkaline solution of ammonium sulfite.

DAVIS A. SKINNER.

References Cited in the file of this patent
UNITED STATES PATENTS

| Number | Name | Date |
| --- | --- | --- |
| 452,378 | Lachomette | May 19, 1891 |